United States Patent
Gauch (10) Patent No.: US 6,246,803 B1
(45) Date of Patent: Jun. 12, 2001

(54) REAL-TIME FEATURE-BASED VIDEO STREAM VALIDATION AND DISTORTION ANALYSIS SYSTEM USING COLOR MOMENTS

(75) Inventor: John M. Gauch, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 0 days.

(21) Appl. No.: 09/337,362

(22) Filed: Jun. 21, 1999

Related U.S. Application Data (60) Provisional application No. 60/113,956, filed on Dec. 27, 1998.

(51) Int. Cl.[7] .................................................. G06K 9/36
(52) U.S. Cl. ........................................ 382/276; 348/1
(58) Field of Search ................................. 382/236, 282, 382/276, 162, 165; 348/1

(56) References Cited

U.S. PATENT DOCUMENTS

| | | |
|---|---|---|
| 4,739,398 | 4/1988 | Thomas et al. . |
| 5,512,933 * | 4/1996 | Wheatley et al. ................ 348/5 |
| 5,584,050 | 12/1996 | Lyons . |
| 5,761,417 | 6/1998 | Henley et al. . |
| 5,818,439 | 10/1998 | Nagasaka et al. . |
| 5,819,286 | 10/1998 | Yang et al. . |
| 5,826,165 | 10/1998 | Echeita et al. . |
| 5,831,638 | 11/1998 | West et al. . |
| 5,832,494 | 11/1998 | Egger et al. . |
| 5,832,495 | 11/1998 | Gustman . |
| 5,832,499 | 11/1998 | Gustman . |
| 5,835,087 | 11/1998 | Herz et al. . |
| 5,835,103 | 11/1998 | Butler et al. . |
| 5,835,625 | 11/1998 | Fitzpatrick et al. . |
| 5,835,667 | 11/1998 | Wactlar et al. . |
| 5,838,311 | 11/1998 | Hayano et al. . |
| 5,844,573 | 12/1998 | Poggio et al. . |
| 5,845,009 | 12/1998 | Marks et al. . |
| 5,845,046 | 12/1998 | Hirayama et al. . |
| 5,850,249 | 12/1998 | Massetti et al. . |

* cited by examiner

Primary Examiner—Joseph Mancuso
Assistant Examiner—F. E. Cooperrider
(74) Attorney, Agent, or Firm—Kyle L. Elliott; Blackwell Sanders Peper Martin LLP (57) ABSTRACT

A real-time distortion analysis system (20) utilizes a baseline preparation processor (38) and a remote comparison processor (50) to determine (72, 78) a plurality of color and central moments for baseline and broadcast video streams respectively. The baseline stream is taken from a broadcast signal sent from a broadcast station (26), and the broadcast video stream is taken from a viewer signal sent from a remote receiving station (28, 30, 32) to viewers (34). The remote comparison processor (50) compares (82), on a frame by frame basis, the baseline and broadcast moments and determines a cumulative absolute difference which reflects differences between the two video streams. To conduct a frame by frame analysis of the two video streams, the system (20) temporally aligns the video streams. Alternatively, the system (20) uses a moment database (88) to compare the moments at a time subsequent to broadcast.

65 Claims, 2 Drawing Sheets

REAL-TIME FEATURE-BASED VIDEO STREAM VALIDATION AND DISTORTION ANALYSIS SYSTEM USING COLOR MOMENTS

RELATED APPLICATIONS

This application claims priority on previously filed and copending U.S. Provisional Application filed Dec. 27, 1998 and having App. Ser. No. 60/113,956.

COPYRIGHT NOTICE AND AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to video stream comparison and distortion analysis to determine variations between two or more video streams and, more particularly, to real-time video stream comparison and distortion analysis utilizing frame-by-frame comparisons of baseline color and intensity moments with broadcast color and intensity moments to determine variations between two or more video streams.

BACKGROUND OF THE INVENTION

Television broadcasting has become prevalent in almost every part of the world. Broadcast signals are continuously transmitted and retransmitted to millions of homes around the world through cable, satellite, and other mediums. The majority of revenues required to operate these television networks are provided by advertisers, and advertisers generally desire some confirmation that the advertising time they paid for was actually transmitted to the viewers. In the broadcast industry, such confirmation is referred to as video reconciliation. Video authentication broadly refers to the process of verifying that a received signal matches identically that which has been broadcast with cable, satellite, or other wireless networks, and reconciliation is the authentication of small video segments such as commercials. Thus, reconciliation is performed by broadcasters to ensure that advertising commercials have been properly inserted for retransmission by affiliate stations and networks. Further, the quality of these transmissions is important to both paying cable and satellite customers and non-paying customers which simply receive a broadcast signal with an antenna and tuner.

To confirm/reconcile that advertisements have been aired and to check the quality of transmissions, two video streams can be compared to find distortions. Some broadcasters employ a laborious and costly approach utilizing paid personnel to reconcile advertising commercials by manually viewing recorded segments and relaying variations to the broadcaster. Disadvantageously, it can take as long as two months before the broadcaster receives a reconciliation report. Because it is not commercially desirable for individuals to continuously monitor and compare a broadcast video stream with a baseline video stream for commercial advertisement reconciliation and quality control, attempts have been made to recharacterize the video streams for comparison by a computer. Further, if two video streams are to be compared at a remote location, the baseline video stream must be recharacterized for transmission to the remote location by a transmission method more reliable and preferably faster than the broadcast signal carrying the broadcast video stream.

The present invention is an important and novel improvement over currently employed systems and methods, as well as processes and methods previously identified in publications and U.S. and foreign patents for recharacterizing and comparing two video streams. For example, as applied to video authentication, the primary advantage of the present invention is that it does not require the insertion of digital or analog "watermarks" into the video stream for tracking or detection. One such advertisement reconciliation system is discussed in U.S. Pat. No. 5,826,165 to Echeita, et al., and pertains to digital video (not analog National Television Standards Committee (NTSC) signals), such as those currently broadcast via direct broadcast satellite (DBS), into which "reconciliation data packets" are inserted into the digital video signal to identify commercials. The reliance upon digital video, video message format standards, and the added complexity of broadcast signal manipulation limits the scope and commercial viability of this approach.

Similarly, other video authentication techniques have been described in the literature, which rely on embedding visible or invisible watermarks within the video signal. One approach is to hide the watermark pattern in the least significant bit of each pixel in each frame. Another approach is to embed this information in the low frequency components of each frame such that the watermark is preserved after an image has been compressed or decompressed using traditional compression techniques such as JPEG (Joint Photographic Experts Group) or MPEG (Moving Pictures Experts Group). One commercially advertised system employing this technique is currently offered by Nielsen Media Research (New Media Services Division) under the trade name of "SIGMA", which embeds an "invisible" code into the video stream for analysis at the signal's receiving end. This embedded code, as described in the literature and through the company's web site, includes encode number, date, and time stamp.

The fundamental difficulty with all water marking schemes is that certain video manipulations such as smoothing can accidentally (or intentionally) alter or destroy the watermark. The present invention avoids these difficulties and simplifies the video delivery process by eliminating the need for watermarks.

Video segment recognition is one application that is related to video distortion analysis, and is described in prior art. For example, U.S. Pat. No. 4,739,398 by Thomas, et al., describes a system, method, and apparatus for recognizing broadcast segments in analog video signals which relies on building a hash table of digital "signatures." Each signature is based on the average luminance for randomly selected frames within a video segment, as well as selected locations within each analyzed frame. The main disadvantages to this method are: (1) two very different video segments can have the same hash table signature, (2) small changes to a single frame can result in very different signatures, and (3) comparing signatures provides no information about spatial, chromatic, or temporal differences between video segments. These factors preclude its use for video stream distortion analysis, as well as its intended application for video reconciliation.

Prior art methods for object recognition, motion tracking, and optical character recognition employ color probability density analysis using color histograms, such as that described in U.S. Pat. Nos. 5,845,009; 5,844,573; and 5,831,638, by Fitzpatrick, et al., Marks, et al., and Poggio, et al., respectively. Color lookup tables and display scheduling tables have been employed in prior art for displaying and interacting with graphical objects displayed with video data, such as those described in U.S. Pat. Nos. 5,835,103; 5,835,625, by Butler, et. al., and West, et al., respectively.

Many prior art methods employ traditional compression algorithms and keyword tagging methodologies to digitally characterize video streams for use with digital libraries, search and retrieval systems, and interactive television applications, such as that described in U.S. Pat. Nos. 5,832,495; 5,832,499; 5,761,417; 5,835,087; 5,845,046; 5,818,439; 5,835,667; and 5,819,286, by Gustman, Gustman, Henley, et al., Herz et al., Hirayama, et al., Nagasaka, et al., Wactlar, et al., and Yang, et al., respectively.

Other prior art methods employ cluster link generation algorithms, including node and link indices for navigating multimedia databases, such as that described in U.S. Pat. No. 5,832,494 by Egger, et al. Finally, Hyano, et al., describe a method that utilizes dot clock phase and frequency to sample color signals in video images.

All such prior art methods and systems include drawbacks which preclude wide spread acceptance for commercial applications such as video reconciliation and precise video distortion analysis. The present invention avoids the drawbacks of these methodologies and presents a novel, more commercially-viable alternative not currently employed in the video or broadcast industries, or previously envisioned by the aforementioned prior art authors and inventors.

SUMMARY OF THE INVENTION

The present invention overcomes the problems outlined above and provides a video stream distortion analysis system utilizing a baseline preparation processor operable to determine a plurality of baseline moments with statistical analysis methodologies and a comparison processor operable to determine a plurality of broadcast moments. The present invention operates to compare the broadcast moments of a broadcast video stream with the baseline moments of a baseline video stream in real time, that is, while the broadcast video stream is actually being broadcasted. The comparison is used to determine variations between the broadcast video stream and the baseline video stream.

In a preferred embodiment, the system includes a baseline transmitter operable to transmit a baseline signal which includes the baseline moments and a remote receiver operable to receive the baseline signal. The comparison processor preferably comprises a remote comparison processor operating to compare the baseline moments received in the baseline signal with the broadcast moments in real time. The comparison processor preferably compares all of the baseline frames of the baseline video stream with all of the broadcast frames of the broadcast video streams. This system further includes a remote transmitter and a baseline receiver operable to transmit and receive, respectively, a variations signal including the variations between the broadcast video stream and the baseline video stream. The preferred transmitters and receivers comprise Ethernet connection cards. The system is also provided with an output mechanism operable to output the variations signal for human evaluation. If desired, the broadcast video stream can be adjusted to compensate for the variations. Alternatively, adjustments can be made at the remote location to compensate for the variations.

Preferably, the baseline and broadcast moments comprise color moments. For each color in the red-green-blue (RGB) color scheme first, second, and third color moments are computed. The first color moment corresponds to the average color value; the second color moment corresponds to the standard deviation of the color values, and the third color moment corresponds to the skew of the color values. The moments can also include central moments and audio moments. The central moments are based on the centers of gray-scale image intensity obtained by averaging the RGB color values. The first order central moments represent centers of image intensity. Second order central moments are also calculated. The second order central moments represent the standard deviation of image intensity, and third order central moments are calculated and represent the skew of image intensity. For the audio moments, first, second, and third order moments are determined for amplitude and frequency.

The variations between the broadcast video stream and the base line video stream are determined by ascertaining a cumulative frame variation for a desired number of frames. The cumulative frame variation is preferably determined by figuring a sum absolute difference. Alternatively, the cumulative frame variation is determined by figuring a Euclidean difference for corresponding moments or by figuring the inner product of the moments. To achieve comparison of directly corresponding frames, a temporal shift is calculated using the cumulative frame variation. At start-up, an approximate temporal shift is selected and the cumulative frame variation is calculated for that temporal shift. The temporal shift is then adjusted incrementally until a predetermined minimum cumulative frame variation is reached. The temporal shift corresponding to the minimum cumulative frame variation is then set as the optimal temporal shift. To reduce computations, the cumulative frame variation determination for each temporal shift is terminated when the minimum cumulative frame variation is reached. The temporal shift is continuously evaluated during operation.

Preferably, nine color moments are calculated for each frame and six central moments are calculated for each frame. By comparing the baseline color and central moments with the broadcast color and central moments, any variations in the broadcast video stream, such as unauthorized commercials which have been transmitted in place of authorized commercials, can be detected. Additionally the comparison can reveal if the intended video stream is being letter boxed or if there is even subtle changes in the color values of the broadcast video stream.

The present invention is also directed to a method for determining variations between two video streams. The system processes one or more broadcast/reference video streams in real time to obtain statistics-based moments that fully characterize every frame (for analog signals) or coded segments (for digital signals) of the video streams to be analyzed. Moments can not be used to reconstruct the original video stream. However, they are formulated from every aspect of the video streams, allowing real-time detection of signal distortions. Preferably, an algorithm is applied to perform temporal alignment of the input video streams to assure synchronization of the streams under comparison, and a novel, adaptive algorithm that calculates cumulative absolute differences between streams is employed by the present invention to detect, analyze, and identify with a high degree of precision, spatial, chromatic, and temporal video stream distortions.

Accordingly, it is an object of the present invention to provide an improved distortion analysis system and method for comparing two or more video streams.

BRIEF DESCRIPTION OF THE DRAWINGS

These and other inventive features, advantages, and objects will appear from the following Detailed Description when considered in connection with the accompanying drawings in which similar reference characters denote similar elements throughout the several views and wherein.

DETAILED DESCRIPTION

Figure 1:
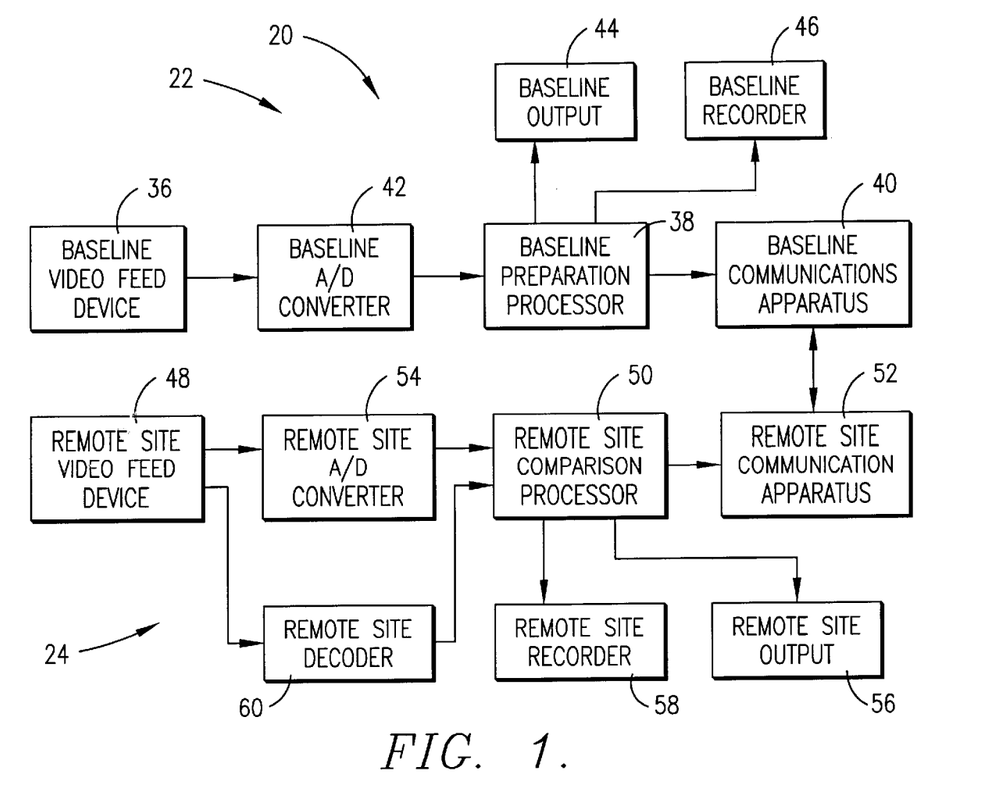
FIG. 1 is a schematic block diagram illustrating the real-time feature-based video stream distortion analysis system according to the present invention.

Referring to the drawings in greater detail, FIG. 1 illustrates a real-time feature-based video stream distortion analysis system 20 having a baseline portion 22 and a remote site portion 24. The distortion analysis system 20 is operable to compare, frame by frame, statistical data developed by the baseline portion 22 from an original/baseline video stream with statistical data developed by the remote site portion 24 from a broadcast video stream. The comparison is used to find differences between the original/baseline video stream and the broadcast video stream, so that operators can take appropriate action based on the nature of the differences. The differences, for example, may be caused by distortions in the audio, spatial, chromatic, and temporal fields introduced into the broadcast video stream during broadcast or by an unscrupulous party removing authorized paid commercials and inserting different advertisements. Thus, the distortion analysis system 20 allows operators to, for example, correct for distortions and discover unauthorized advertisements.

Figure 2:
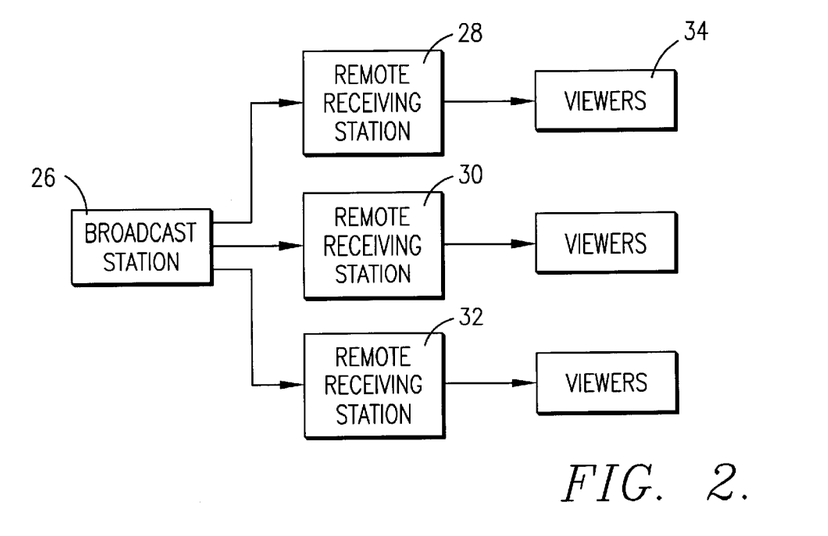
FIG. 2 is a schematic block diagram illustrating a broadcast network utilizing the distortion analysis system of FIG. 1.

Referring to FIG. 2, to understand the operation of the invention, it is helpful to have a basic understanding of an example of how broadcast signals reach viewers. A broadcast station 26 sends a broadcast signal through conventional devices, such as a satellite, to a plurality of remote receiving stations 28, 30, 32. The remote receiving stations 28–32 receive the broadcast signal and then retransmit a viewer signal to viewers 34. The remote receiving stations may insert local content into the viewer signal. The viewer signal contains the broadcast video stream from which the remote site portion 24 develops the statistical data for comparison. The original or baseline video stream is taken from the broadcast signal sent from the broadcast station 26 to the remote receiving stations 28–32. The baseline video stream can be accessed after it has been transmitted or before it is transmitted by taking the baseline video stream directly from the broadcast station hardware. The baseline and broadcast video streams each include a plurality of frames which are analog or digital representations of individual images in the video streams. In digital format, each frame is made up of a coded segment of digital data. The United States uses NTSC compliant signals in which frames are transmitted at a rate of approximately 30 frames per second. The invention, however, is also applicable to SECAM, PAL, and other video formats which have slower frame transmission rates.

Referring again to FIG. 1, the baseline portion 22 includes a baseline video feed device 36, a baseline preparation processor 38, and a baseline communications apparatus 40. The baseline portion 22 also preferably includes a baseline analog-to-digital converter 42, a baseline output mechanism 44, and a baseline recorder 46.

The baseline video feed device 36 is operable to introduce the baseline video stream into the system 20 and to the baseline processor 38. The baseline video feed device can comprise an analog or digital baseline tuner for selecting and receiving the broadcast signal from a plurality of broadcast signals. Alternatively, the baseline video feed device comprises the appropriate hardware for interfacing directly with the hardware of the broadcast station 26. If desired, multiple tuners can be used to receive and introduce multiple baseline video streams into the system.

The baseline preparation processor 38 is operable to perform an analysis of the baseline video stream having a plurality of frames at the rate at which the frames are broadcast. For NTSC signals that rate is just under 30 frames per second, but other frame rates are possible. The analysis includes determining a plurality of baseline color moments for the baseline video stream and a plurality of baseline central moments for the baseline video stream, for all frames, in real time, that is, while the broadcast signal is being transmitted for viewing.

The baseline communications apparatus 40 preferably includes a baseline transmitter operable to transmit a baseline signal in real time. The baseline signal includes the color and central moments. The communications apparatus also includes a baseline receiver operable to receive signals from the remote site portion 24. In preferred forms, the communications apparatus is an Ethernet connection card or a modem.

The baseline analog-to-digital converter 42, or alternatively a digitizing board, is operable to digitize frames of the baseline video stream for analysis by the baseline processor. To maintain a real time analysis the converter operates at an input rate of approximately 30 frames per second.

The baseline output mechanism 44 preferably provides output in readable format for operators to evaluate the comparison between the baseline video stream and the broadcast video stream. The output can be sent to a printer or a database for storage.

The baseline video recorder 46 is operable to record the baseline video stream. Preferably, the baseline recorder 46 is a digital video recorder and records selected segments of the baseline stream in a digital format when the system detects differences between the baseline video stream and the broadcast video stream.

One preferred embodiment of the present invention incorporates a 300 MHz (or higher) Pentium II computer (PC), SoundBlaster®-compatible audio card, one video digitizing board (e.g., Osprey 100) and Video For Windows (VFW) application (e.g., a library provided by Microsoft Visual C++), and a video feed/source, such as coaxial cable television feed, VCR output, or any digital video source such as a DVD drive or DBS satellite dish. For one preferred embodiment of the present invention, the computer includes 128 MB RAM, 6.2 GB hard drive, and 10/100 Mbps Ethernet connection card. The proprietary software, other than the nominal commercial developer tools employed, is described more fully in EXAMPLE 1 below. It is understood that additional hardware and/or software may be employed in other embodiments of the present invention. The 300 MHz Pentium II processor can handle resolutions up to 320×240. In other embodiments of the present invention, dual processor computers or fast workstations are employed for even larger images. Once the video component has been digitized, the system digitizes the audio signal at a nominal rate of 8000 samples per second using the internal SoundBlaster®-compatible audio card.

With continued reference to FIG. 1, the remote site portion 24 includes a remote site video feed device 48, a remote site preparation processor 50, and a remote site communications apparatus 52. The remote site portion 24 also preferably includes a remote site analog-to-digital converter 54, a remote site output mechanism 56, and a remote site recorder 58. Additionally, or as an alternative to the remote site analog-to-digital converter 54, the remote site also includes a remote site decoder 60. Preferably, a remote site is used in connection with each of the remote receiving stations 28–32, and each remote site receives the viewer signal just as an ordinary viewer 34 would.

The remote video feed device 48 is operable to introduce the broadcast video stream into the system 20 and to the remote processor 50. The remote video feed device 48 can comprise an analog or digital remote tuner for receiving the viewer signal or appropriate hardware for interfacing with the remote receiving stations. If desired, multiple tuners can be used to receive and introduce multiple broadcast video streams into the system 20.

The remote site preparation processor 50 is operable to perform an analysis of the broadcast video stream at the rate at which the frames are broadcast. The analysis includes determining a plurality of broadcast color moments for the broadcast video stream and a plurality of broadcast central moments for the broadcast video stream These moments are preferably determined in real time, that is, while the viewer signal is being transmitted for viewing. Preferably, the remote processor 50 is further operable to determine variations between the baseline moments and the broadcast moments. Alternatively, the baseline processor 38 can be used to determine the variations. Thus, an operator can select either the baseline processor or the remote processor to determine the variations. The remote processor 50 is also operable to determine a temporal shift between receipt of the baseline signal and the viewer signal containing the broadcast video stream thereby achieving a frame to frame comparison of every frame of the baseline video stream to every frame of the broadcast video stream.

The remote site communications apparatus 52 preferably includes a remote transmitter operable to transmit a variations signal including the variations determined by the remote processor 50. The remote transmitter is also operable to send a record signal upon detection of variations above a predetermined amount. The record signal is received by the baseline communications apparatus 40, and the baseline recorder 46 records the baseline video stream upon receipt of the record signal. The remote communications apparatus also includes a remote receiver operable to receive the baseline signal which includes the baseline moments. In preferred forms, the communications apparatus is an Ethernet connection card or a modem.

The remote site analog-to-digital converter 54, or alternatively a digitizing board, is operable to digitize frames of the broadcast video stream for analysis by the remote processor 50. To maintain a real time analysis the converter operates at an input rate of approximately 30 frames per second for NTSC signals. Because the viewer signal may be transmitted in a digital format such as MPEG or JPEG, the decoder 60 is provided and is operable to decode these digital signals into the frame by frame format need to determine the broadcast moments for each broadcast frame.

The remote output mechanism 56 preferably provides output in readable format for operators to evaluate the comparison between the baseline video stream and the broadcast video stream. The output can be sent to a printer or a database for storage.

The remote video recorder 58 is operable to record the broadcast video stream. Preferably, the baseline recorder 58 is a digital video recorder and records selected segments of the broadcast video stream in a digital format when the system detects differences between the baseline video stream and the broadcast video stream. Thus, when differences are detected the baseline video stream and the broadcast video stream are simultaneously recorded for comparison.

Figure 3:
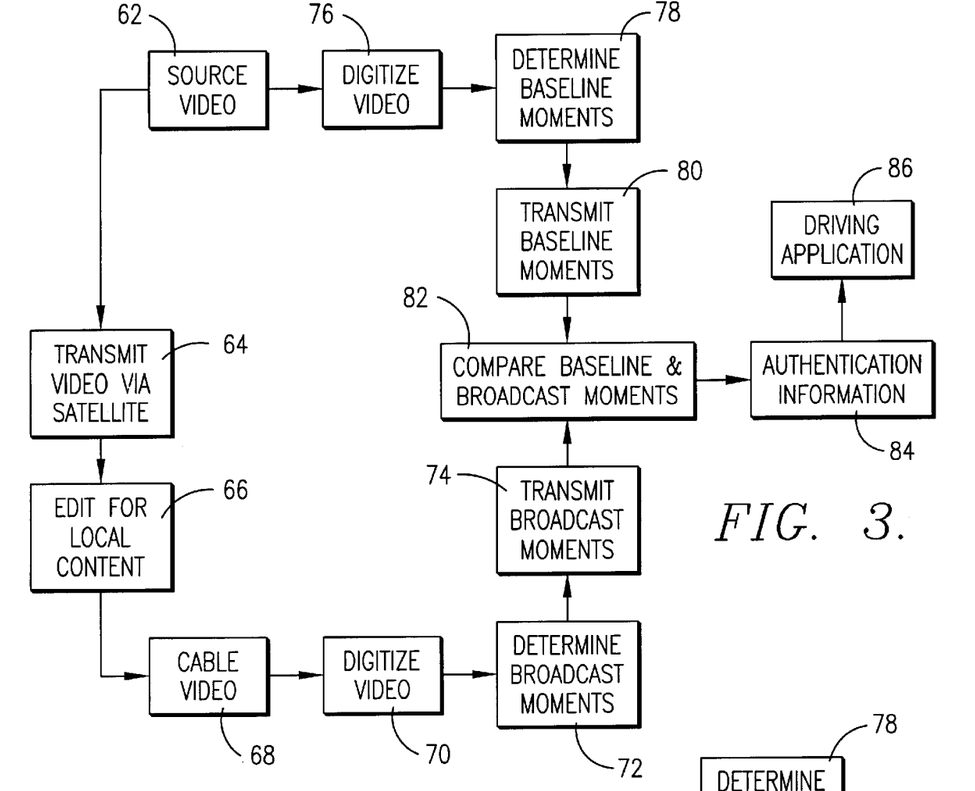
FIG. 3 is a schematic block diagram illustrating the operation of the distortion analysis system of FIG. 1.

Referring to the operation of the system illustrated in FIG. 3, which is a flow diagram generally illustrating the steps performed by copyright protected source code contained in Appendix A, the system 20 utilizes statistical comparison of the baseline video stream with the broadcast video stream to locate even slight variations between the two video streams. A source video 62 is transmitted along two paths.

The first path is an ordinary broadcast path as described above in connection with FIG. 2. As illustrated in step 64 of FIG. 3, the broadcast signal is transmitted via satellite, and in step 66, the receiving stations edit the signal for local content. The viewer signal is then transmitted to the viewers by conventional methods such as cable transmission illustrated by step 68. At his point, the viewer signal, which contains the broadcast video stream is introduced into the system 20 at the remote portion 24 by the remote video feed device 48. The broadcast video stream is then digitized or decoded at step 70. The broadcast video stream is digitized if the viewer signal is analog, and it is decoded if the viewer signal is in digital format.

As illustrated by step 72, the broadcast moments are then determined. Preferably, fifteen broadcast moments are determined for each frame and include nine broadcast color moments and six central moments. The nine broadcast color moments include three red broadcast moments, three green broadcast moments, and three blue broadcast color moments. Though the statistical moment principles are preferably applied to the RGB color scale, they could also be applied, for example, to the YIQ, HIS, and Lab color spaces/scales as well as audio signals using frequency and amplitude to determine the statistical moments. For black and white video, the statistical moment principles are applied to the gray-scale values. Thus, there are three black and white moments and six central moments for black and white video.

The nine broadcast color moments include broadcast first order red, green, and blue moments, broadcast second order red, green, and blue moments, and broadcast third order red, green, and blue moments. The first order moments represent averages of the color values determined by dividing the sum of each of the RGB color values by the total number of pixels. Specifically, each pixel of a frame has a red value, a green value, and a blue value which are represented by whole numbers. The red value of each pixel in the frame is determined; the red values are added together, and then that sum is divided by the total number of pixels which depends on the resolution of the frame (e.g., 640×480, 320×240, 160×120, etc.). This determination is also made for the green and blue color values, and the following formulas, which are listed in the left hand column of TABLE 1, express this determination:

TABLE 1

$$MR1 = \frac{1}{N}\sum_{i=1...N} r_i \quad MR2 = \left(\frac{1}{N}\sum_{i=1...N}(r_i - MR1)^2\right)^{1/2} \quad MR3 = \left(\frac{1}{N}\sum_{i=1...N}(r_i - MR1)^3\right)^{1/3}$$

$$MG1 = \frac{1}{N}\sum_{i=1...N} g_i \quad MG2 = \left(\frac{1}{N}\sum_{i=1...N}(g_i - MG1)^2\right)^{1/2} \quad MG3 = \left(\frac{1}{N}\sum_{i=1...N}(g_i - MG1)^3\right)^{1/3}$$

$$MB1 = \frac{1}{N}\sum_{i=1...N} b_i \quad MB2 = \left(\frac{1}{N}\sum_{i=1...N}(b_i - MG1)^2\right)^{1/2} \quad MB3 = \left(\frac{1}{N}\sum_{i=1...N}(b_i - MG1)^3\right)^{1/3}$$

In Table 1, MR1 is the first moment of the red components of the frame; MG1 is the first moment of the green components of the frame; MB1 is the first moment of the blue components of the frame; N is the number of pixels in each frame; i is the index or location of each pixel in the frame; $r_i$ is the red component of the i pixel in the frame; $g_i$ is the red component of the i pixel in the frame, and $b_i$ is the blue component of the i pixel in the frame. The location i is a single dimensional array corresponding to the number of the pixel. Alternatively, the equation could be modified to use a two dimensional array for pixel location.

The nine color moments also include second order color moments which represent standard deviations of the color values determined by summing the squares of the differences of each color value and corresponding first moment, dividing that sum by the number of pixels, and taking the square root of that quotient. The standard deviation for each of the red, green, and blue color components is calculated using the formulas set forth in the middle column of Table 1. In Table 1, MR2 is the second moment of the red components of the frame; MG2 is the second moment of the green components of the frame; and MB2 is the second moment of the blue components of the frame.

Third order color moments are also determined and represent skews of the color values determined similarly to the standard deviation except that the difference is cubed and the third root of the quotient is taken. The skew for each of the red, green, and blue color components is calculated using the formulas set forth in the right hand column of Table 1. In Table 1, MR3 is the third moment of the red components of the frame under analysis; MG3 is the third moment of the green components of the frame, and in MB3 is the third moment of the blue components of the frame.

When determining the second and third order color moments for a selected frame under analysis, the first order color moments from an immediately previously frame are used in the second and third moment formulas. Because the first order moment is used to determine the second and third order moments, this allows the second and third order moment determinations to be completed in one pass over the frame. Using the first moments from the previous frames is possible because significant changes in the first moments are atypical. To confirm that the second and third moments are correct, the first moments from the selected frame are compared to the first moments from the previous frame. If the first moments from the selected frame are not substantially identical to the first moments from the previous frame, a second pass is made over the selected frame to determine the accurate second and third moments based on the first moments of the selected frame. If the highest level of sensitivity to distortion is required, the second and third moments are redetermined unless the first moments of the adjacent frames are identical. In a preferred embodiment, an operator can manually select and adjust this and other variables which control the level of sensitivity during operation of the system 20. This analysis is applied independently to each of the colors, so that if the red and green first moments of the two adjacent frames are the same, only the blue second and third order moments are recalculated.

The six broadcast central moments include first order x and y direction broadcast central moments, second order x and y direction broadcast central moments, and third order x and y direction broadcast central moments. The first order central moments represent centers of gray-scale image intensity. The concept of a center of image intensity is analogous to the concept of center of mass with the property of mass being replaced by gray-scale image intensity. To determine the x direction broadcast moment, that is the column in which the center is located, the gray-scale image intensity for each pixel, determined by averaging the red, green, and blue color values, is multiplied by its x or column position. The image intensity for each pixel is determined using the formula, $I_i=(r_i+g_i+b_i)/3$. Alternatively, brightness or luminance is computed depending on the color space used, such as YIQ, Lab, or HIS. The sum of the products of all the image intensities and their column positions is divided by the product of the total number of rows and columns of the frame under analysis. To determine the y direction broadcast moment, that is the row in which the center is located, the gray-scale image intensity for each pixel, determined by averaging the red, green, and blue color values, is multiplied by its y or row position. Again, the sum of the products of all the image intensities and their row positions is divided by the product of the total number of rows and columns of the frame under analysis. The following formulas, which are listed in the top row of TABLE 2, express this determination:

TABLE 2

$$MX1 = \frac{1}{R \cdot C}\sum_{x=1...C}\sum_{y=1...R}(x \cdot I_{x,y}) \qquad MY1 = \frac{1}{R \cdot C}\sum_{x=1...C}\sum_{y=1...R}(y \cdot I_{x,y})$$

TABLE 2-continued $$MX2 = \left(\frac{1}{R \cdot C} \sum_{x=1...C} \sum_{y=1...R} (x - MX1)^3 I_{x,y}\right)^{1/2} \quad MY2 = \left(\frac{1}{R \cdot C} \sum_{x=1...C} \sum_{y=1...R} (y - MY1)^2 I_{x,y}\right)^{1/2}$$

$$MX3 = \left(\frac{1}{R \cdot C} \sum_{x=1...C} \sum_{y=1...R} (x - MX1)^3 I_{x,y}\right)^{1/3} \quad MY3 = \left(\frac{1}{R \cdot C} \sum_{x=1...C} \sum_{y=1...R} (y - MY1)^3 I_{x,y}\right)^{1/3}$$

In TABLE 2, MX1 is the center of image intensity in the x-direction; MY1 is the center of image intensity in the y-direction; x is the column position; y is the rom position; $I_{x,y}$ is the image intensity at pixel location x,y; R is the total number or rows, and C is the total number of columns. Thus, a two dimensional array is used to define the positions of the pixels.

The second order central moments represent the standard deviation of image intensity. The second order central broadcast moments are determined using the formulas in the second row of Table 2 in which MX2 is the x-direction second order moment, and MY2 is the y-direction second order moment. Similarly to the second order color moments, the second central moments square the difference of the columns/rows and the first central moments. That difference is then multiplied by the corresponding intensity valve, and those products are summed. The sum is divided by the product of R and C, and the square root of the final quotient is taken.

The third order central moments represent the skew of image intensity. The third central moments are determined using the formulas in the third row of TABLE 2 in which MX3 is the x-direction third order moment and MY3 is the y-direction third order moment. The third order central moments are determined similarly to the second order central moments, except the third order central moments cube the differences of the columns/rows and the first central moments and take the cube root of the final quotient. In determining the second and third central moments, the first central moments from directly previous frames are used, as with the color moments, to reduce the number of computations and make, in most instances, only one pass over each frame necessary to determine the central moments for that frame.

As illustrated by step 74, the fifteen broadcast moments are then transmitted for real time comparison. Alternatively, the broadcast moments can be transmitted to a data base 88 (FIG. 4) at the broadcast station or some other location and stored for comparison at a time subsequent to broadcast of the viewer signal. Preferably, the broadcast moments are simply held at the remote site for real time comparison by the remote comparison processor 50. Thus, the moments include a plurality of moment types. The preferred moment types are color averages, color standard deviations, and color skews for each color. The preferred moment types also include image intensity center, image intensity standard deviation, and image intensity skew.

The second path for the source video 62 takes the source video either from the broadcast signal or by direct line from the broadcast station hardware and digitizes the video, as illustrated by step 76, with the analog to digital converter 42 or the digitizing board. The baseline moments are then determined in step 78 similar to how the broadcast moments are determined in step 72. The baseline moments are then transmitted in step 80 to the remote comparison processor

50. Preferably, the baseline moments are received at the remote site 24 before the broadcast moments are determined. Alternatively, the baseline moments are transmitted to a data base at the broadcast station or some other location and stored for comparison at a time subsequent to transmission of the viewer signal. Preferably, the baseline moments are transmitted to the remote processor for real time comparison.

In step 82, the broadcast moments are compared with the baseline moments for each pair of frames to determine frame variations therebetween. The frame variations are preferably found by determining the sum absolute differences between the fifteen moments of corresponding frames using the sum absolute difference formula:

$$Diff(A, B) = \frac{1}{15} \sum_{i=1...15} |MA_i - MB_i|$$

In the sum absolute difference formula, Diff(A,B) is the sum absolute difference between the fifteen moments of the corresponding frames; A is the baseline frame under comparison; B is the broadcast frame under comparison; $MA_i$ and $MB_i$ are the corresponding fifteen moments for frames A and B, and i is the index of the moments being compared. To determine the sum absolute difference for each frame, each moment of the broadcast frame is subtracted from their corresponding moments in the baseline frame. Because the absolute value of the difference is used, it is also possible to subtract the baseline moments from the corresponding broadcast moments. For example, the first order broadcast red moment is subtracted from the first order baseline red moment, and the second order broadcast blue moment is subtracted from the second order baseline blue moment. The absolute values of these differences are then summed and divided by the total number of moments, preferably fifteen. Where MA and MB are identical the difference is zero.

Alternatively, variations are determined with other known concepts. For example, the inner product, Euclidean difference, or L-infinite norm of $MA_i$ and $MB_i$ are calculated. The inner product of $AM_i$ and $MB_i$ is determined and normalized by the lengths of the products of $MA_i$ and $MB_i$. This is essentially equivalent to calculating the cosine of the angle between lines extending from a zero origin and extending to the points represented by the moments, for example, $MA_1$, $MA_2$ and $MB_1$, $MB_2$, if there are only two moments for each of the two frames under comparison. When $MA_i$ and $MB_i$ are equal, that is when the moments are equal, the lines overlap and the angle between them is zero, so that the cosine of the angle is one. In determining the Euclidean distance, the square root of the sum of the squares of the differences between corresponding moments is found. The Euclidean distance is zero when $MA_i$ and $MB_i$ are equal, that is when $MA_1$ equals $MB_1$, $MA_2$ equals $MB_2$, . . . , and $MA_{15}$ equals $MB_{15}$. In the L-infinite norm determination, the absolute value of the differences between the moments are raised to the infinite power, summed, and divided by the number of moments. That quotient is then raised to the one over infinite power thereby highlighting the largest difference between the fifteen moments. This determination essentially locates the corresponding moments with the greatest difference. Thus, in an alternate embodiment, this determination is used as a pretest to determine any variation between two frames. If the maximum difference between the moments of two frames under comparison is above a preselected number, then the frames are considered different, and the more computationally intensive determination, i.e. Euclidean distance, is not performed. If the maximum difference between the moments is less than or equal to the predetermined number, which can be manually selected and adjusted, five for example, the variation is computed preferably using the sum absolute differences formula. Other concepts could also be utilized to determine the variations between corresponding baseline and broadcast frames.

After the variations are determined for each frame, the cumulative frame variations for a selected number, which can also be manually selected and adjusted, of sequential frames are added to find a cumulative absolute difference for the selected number of sequential frames. The cumulative absolute difference determination is represented by the following cumulative absolute difference formula:

$$CumDiff(A, B, S) = \sum_{t=0...T} Diff(A_t, B_{t+S})$$

In the cumulative absolute difference formula, CumDiff (A,B,S) is the cumulative absolute difference, A and B are the two sets of frames being compared, S is the temporal shift (described below) between the two video streams containing the two sets of frames, T is the number of sequential frames under comparison, and t is the time index of the frames in sequence A and B. The number of frames T is selected to achieve the desired level of sensitivity, and if a cumulative difference above a predetermined amount is found, authentication information is recorded at step 84 by the baseline and remote site recorders 46, 58. The authentication information in the verification signal includes digitally recorded video segments from both the baseline and broadcast video streams corresponding to the unacceptably high cumulative difference value. Further, the remote site output 56 or another output mechanism at another location provides a detailed explanation of the differences as part of the authentication information. This information is then used to guide the driving application 86 such as video authentication, video reconciliation, and broadcast signal trouble shooting or quality control issues. Thus, a paid individual only reviews video which is known to be different thereby saving considerable time and cost.

Because the comparison processor receives the baseline video stream and the broadcast video stream at different times, the comparison processor 50 temporally aligns the two video streams. The comparison processor determines the temporal shift S using the cumulative difference formula. At start up, an S value is assumed and the cumulative difference is determined for a selected number of frames T. If the cumulative difference is above a preferably manually selected and adjusted minimum value, the S value is incrementally shifted. To reduce computations without sacrificing accuracy, the summation is terminated when the minimum cumulative difference is reached. If the minimum value is reached after T-10 frames, the computations for that S value are terminated; S is shifted, and the cumulative difference determination is started for the next S value. Using this computationally efficient step, the alignment of the two video streams is continuously checked as the two video streams are compared, so that the system can find an S value yielding the smallest cumulative difference.

Figure 4:
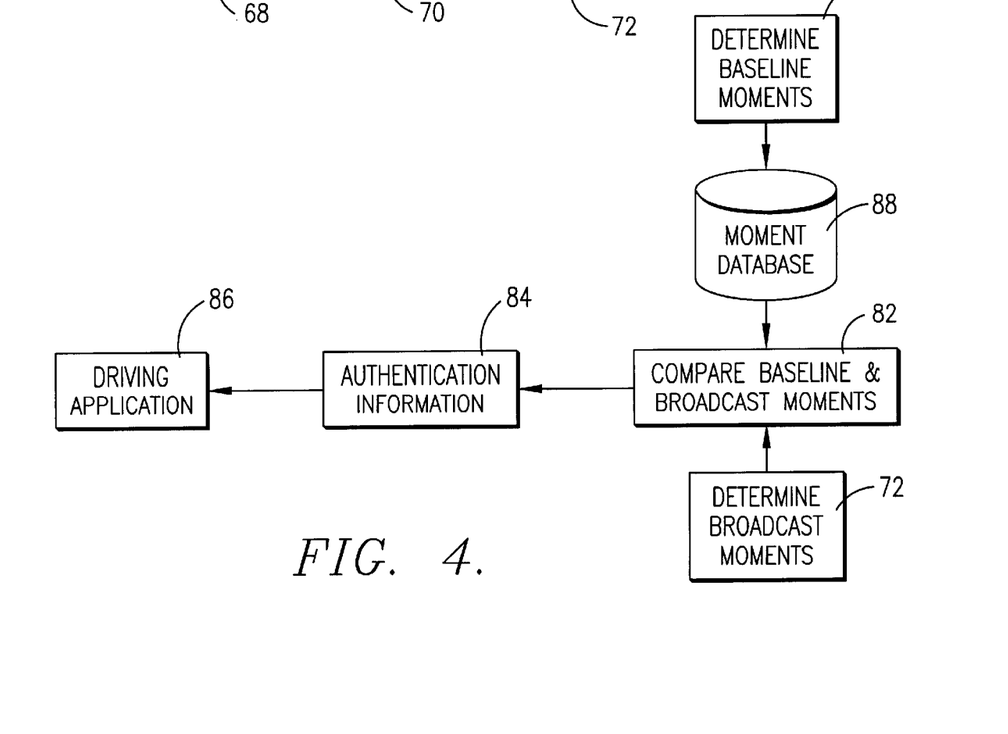
FIG. 4 is a schematic block diagram illustrating the operation of the distortion analysis system with a moment database.

As illustrated in FIG. 4, the system is also operable to compare video streams after transmission. The baseline moments are stored in a moment database 88. The database is provided as part of the baseline portion 22 or the remote site portion 24. Alternatively, the moment database 88 is provided at any other convenient location. The moment database also allows for video stream identification. In this feature of the invention, a broadcast video stream is compared with many baseline video streams stored in the moment database to find the corresponding baseline video stream.

The detection of high cumulative absolute difference values within the system triggers secondary analysis to identify the type of video distortion that has occurred. For example, chromatic distortions such as changes in hue are reflected by shifts in the average RGB color in an image. As such, the system detects large changes in MR1, MG1, and MB1 with relatively small changes to the second and third color moments. If the image brightness remains constant for this example, the spatial moments will remain unchanged. Similarly, geometric distortions are characterized by translations in the central spatial moments, with little change to the color moments. For example, when a video stream has been "letter boxed" (e.g., stretched or compressed to fit in a subwindow on the display), the first central spatial moments will move towards the center of the letterbox rectangle. The degree of stretching or compressing that has taken place is then approximated by the ratios of the second spatial moments.

Broadcasting a video stream can introduce a consistent change in one or more of the moments. These changes can decrease the sensitivity of the system. If the first blue moments are consistently increased by ten, a localized change of five is only fifty percent of the difference. To increase the distortion sensitivity of the system, the dynamic range of each of the fifteen moments is normalized by archiving historical baseline and broadcast data for frequently transmitted video streams. Specifically, the mean values, mean(MK), and the standard deviations, stddev (MK), for each of the fifteen moments of the baseline and broadcast video streams are determined and stored. When determining the final moments for comparison between the baseline and broadcast video streams under comparison, the moments are determined by subtracting the historical mean from the moment actually determined and dividing that difference by the standard deviation as expressed by the following formula.

$$MK'_i = (MK_i - mean(MK))/stddev(MK).$$

In the sensitivity enhancement formula, $MK'_i$ is the adjusted/final moment for comparison and $MK_i$ is the actual moment determined from the video streams. After the adjusted/final moments have been determined, they are used to determine the sum absolute difference. By subtracting the mean moments, the system accounts for consistent changes in the moments, and by dividing by the standard deviation, the system accounts for a consistent changes in the range of the moment values.

When quality control is not an issue, such as when a broadcaster is interested only in reconciliation, the computations performed by the system are reduced by diminishing its sensitivity to noise or essentially ignoring small distortions. To accomplish this, the moments are "smoothed" across adjacent frames using a selected one of the many available processing techniques such as median filtering which removes occasional spikes in a sequence of moments.

One preferred embodiment of the present invention is summarized by following process description of the key functions of the system as described above in analyzing video distortion of two or more "live" video streams in real-time:

EXAMPLE 1

A. Assign one computer and digitizing board to each video source being processed for distortion (these computers may be widely separated geographically).

B. Perform the necessary network connections and client/server initializations to enable each of the computers performing real-time distortion analysis to transmit messages to each other.

C. On each distortion analysis computer, calculate the chromatic and spatial moments as follows:
  1. Digitize the video frame using VFW callbacks provided by C++ SDK;
  2. Copy the digitized video frame into a local image buffer for analysis;
  3. Initialize the MR1, MG1, MB1, MX1, MY1 accumulators to zero;
  4. For each pixel in the image (calculate first moments):
     a. Determine the R, G, B and X, Y frames for the pixel;
     b. Calculate the brightness (gray) I=(R+G+B)/3 for pixel X, Y;
     c. Increment the MR1, MG1, MB1 accumulators by adding R,G,B;
     d. Increment MX1, MY1 accumulators by adding X*I and Y*1;
  5. Divide moment accumulators above by the number of pixels in the image;
  6. Initialize the MR2, MG2, MB2, MX2, MY2 accumulators to zero;
  7. Initialize the MR3, MG3, MB3, MX3, MY3 accumulators to zero;
  8. For each pixel in the image (calculate second and third moments):
     a. Calculate R-MR1, G-MG1, B-MB1 and X-MX1, Y-MY1 values for the pixel;
     b. Increment the MR2, MG2, MB2 accumulators by adding $(R-MR1)^2$, $(G-MG1)^2$, and $(B-MB1)^2$, respectively;
     c. Increment the MR3, MG3, MB3 accumulators by adding $(R-MR1)^3$, $(G-MG1)^3$, respectively;
     d. Increment the MX2, MY2, and MX3, MY3 accumulators by adding $I*(X-MX1)^2$, $I*(Y-MY1)2$, and $I*(X MX1)3$, $I*(Y-MY1)3$, respectively;
  9. Divide second and third order moment accumulators by the number of pixels in the image;
  10. Calculate the square root of second order moments;
  11. Calculate the cube root of third order moments;
  12. Subtract the historical mean from each moment and divide by the historical standard deviation of each moment;
  13. Transmit the moment values calculated above together with timing information to all computers which have requested this data for performing real-time distortion analysis;

D. On each distortion analysis computer, compare features from other video sources as follows:
  1. Create storage arrays for local video moments and remote video moments;
  2. Create background "callback" functions for accepting moment information from remote servers (who are transmitting data in step C13 above);
  3. Suspend video distortion analysis computations until K frames of moment information have been received from the remote server and from the local computations (i.e., sleep);
  4. Search for temporal alignment S which yields the minimum cumulative absolute difference (CAD) value for the first K frames in the storage array;
  5. Perform distortion analysis on remaining frames as follows:
     a. Sleep until next K frames of moment information are available;
     b. Calculate the CAD value for the next K frames using the temporal alignment S;
     c. If the CAD value is approximately zero, the two signals are identical;
     d. If the CAD value is large, but previous CAD values are small, perform secondary analysis to characterize the distortion as required by the application;
     e. For example, if there are significant changes to most of the moments the distortion is identified as an edit where video data in one stream has been replaced;
  6. Record CAD and secondary analysis data locally and/or transmit distortion report to other applications or individuals as needed.

The algorithms employed by the present invention have not previously been applied in prior art for video distortion analysis. Furthermore, this analysis capability provides a level of sensitivity unavailable through any other commercially available system. All of the calculations performed by the system described herein are implemented very efficiently, which enable system users to compare one or more video streams simultaneously using currently available computational resources.

Thus, the present invention relates to the real-time processing of video streams in either digital or analog form, with or without an audio component, for precise analysis of distortion within such video streams or in comparison of two or more such video streams. Such video streams include, but are not limited to, video libraries, video tapes, video optical disks, and "live" or delayed broadcast signals. This invention represents a novel commercially-viable system for analyzing complete video streams in real time, which can be employed by broadcasters, advertising entities, "watchdog" entities (such as consumer advocate agencies), or quality assurance personnel for video comparisons, reconciliation, tracking, and transmission trouble-shooting. This system makes it possible to determine, in real time, if two or more video signals are identical. If they are not identical, this system can determine the types of changes that have occurred. This determination is made with a high degree of precision. That is with an error rate of approximately 1% for analog signals and approximately 0.1% for digital signals.

Thus, a real-time distortion analysis system is disclosed which utilizes statistical methodologies to recharacterize and compare two or more video streams thereby locating and identifying differences between the video stream. While preferred embodiments and particular applications of this invention have been shown and described, it is apparent to those skilled in the art that many other modifications and applications of this invention are possible without departing from the inventive concepts herein. For example, while real time analysis is preferred, it is possible to store the moments of two video streams for comparison at a later date and time. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

I claim:

1. A video stream distortion analysis system comprising:
   a baseline preparation processor operable to perform an analysis of a baseline video stream having a plurality of baseline frames, the analysis including determining a plurality of baseline color moments, including a plurality of baseline color moment types, for the baseline video stream, and to transmit a baseline signal including the plurality of baseline color moments; and
   a remote comparison processor operable to perform an analysis of a broadcast video stream having a plurality of broadcast frames, the analysis including determining a plurality of broadcast color moments, including a plurality of broadcast color moment types, for the broadcast video stream, to receive the baseline signal, and to determine variations between the baseline color moments and the broadcast color moments.

2. The system according to claim 1 wherein the baseline preparation processor is operable to determine the baseline color moments and transmit the baseline signal in real time; and the remote comparison processor is operable to receive the baseline signal, determine the broadcast color moments, and determine the variations between the baseline color moments and the broadcast color moments in real time.

3. The system according to claim 1 further comprising a database operable to store a plurality of sets of the baseline color moments each set of the baseline color moments corresponding to a baseline video stream segment, and the remote processor being operable to compare the broadcast color moments with the sets of the baseline color moments and to determine which set of baseline color moments corresponds to the broadcast color moments.

4. The system according to claim 3 wherein the remote processor is operable to compare the broadcast color moments with the sets of the baseline color moments and to determine which set of baseline color moments corresponds to the broadcast color moments in real time.

5. The system according to claim 3 wherein the database is further operable to store the broadcast color moments, and the remote processor is operable to compare the broadcast color moments with the sets of the baseline color moments and to determine which set of baseline color moments corresponds to the broadcast color moments at a time subsequent to broadcasting of the broadcast video stream.

6. The system according to claim 1 further comprising a baseline transmitter operable to transmit the baseline signal including the plurality of color moments and a remote receiver operable to receive the baseline signal from the baseline transmitter.

7. The system according to claim 6 wherein the transmitter and receiver comprise Ethernet connection cards.

8. The system according to claim 6 wherein the transmitter and receiver comprise modems.

9. The system according to claim 6 further comprising a remote transmitter operable to transmit a variations signal including the variations between the baseline color moments and the broadcast color moments and a baseline receiver operable to receive the variations signal from the remote transmitter.

10. The system according to claim 9 further comprising an output mechanism operable to output the variations signal for evaluation.

11. The system according to claim 1 further comprising a baseline analog to digital converter operable to digitize the frames of the baseline video stream for analysis by the baseline processor.

12. The system according to claim 11 wherein the baseline analog to digital converter is operable to digitize frames at an input rate of approximately thirty frames per second.

13. The system according to claim 1 further comprising a decoder operable to decode digital video streams, and wherein the broadcast video stream comprises a digital, broadcast video stream.

14. The system according to claim 1 further comprising a remote tuner operable to select and receive a desired one of a plurality of viewer signals including the broadcast video stream.

15. The system according to claim 14 further comprising a baseline tuner operable to select a desired one of a plurality of broadcast signals.

16. The system according to claim 1 further comprising a plurality of remote tuners operable to receive a plurality of broadcast signals each containing a broadcast video stream, and wherein the remote processor is operable to substantially simultaneously analyze the broadcast video streams.

17. The system according to claim 1 wherein the baseline processor is further operable to determine a plurality of baseline central moments for the baseline video stream, and the remote comparison processor is further operable to determine a plurality of broadcast central moments for the broadcast signal and determine variations between the baseline central moments and the broadcast central moments.

18. The system according to claim 1 wherein the remote comparison processor is operable to determine a temporal shift between receipt of the baseline signal by the receiver and receipt of the broadcast signal.

19. A videostream distortion analysis system comprising:
   a baseline video feed device operable to introduce a baseline video stream having baseline frames into the system;
   a baseline preparation processor operable to perform an analysis on the baseline video stream frames, the analysis including determining a plurality of baseline moments, a plurality of baseline moment types, for the baseline video steam frames;
   a baseline transmitter operable to transmit a baseline signal including the plurality of moments; and
   a plurality of remote sites, each remote site including:
      a remote video feed device operable to introduce a broadcast video stream having broadcast frames into the system;
      a remote receiver operable to receive the baseline signal from the baseline transmitter; and
      a remote comparison processor operable to perform an analysis on the broadcast video stream frames, the analysis including determining a plurality of broadcast moments, including a plurality of broadcast moment types, for the broadcast video stream, and to determine variations between the baseline moments and the broadcast moments.

20. The system according to claim 19 wherein the baseline processor is operable to analyze all baseline frames of the baseline video stream at approximately thirty frames per second in real time and the baseline frames comprise video frames.

21. The system according to claim 19 wherein the comparison processor is operable to determine a frame variation for corresponding broadcast frames and baseline frames.

22. The system according to claim 21 wherein the comparison processor is operable to determine a cumulative frame variation for a plurality of frame variations.

23. A method for detecting video stream distortion with a video stream distortion detection system, the method comprising:

introducing a baseline video stream having a plurality of baseline frames into the system;

determining a plurality of baseline color moments, including a plurality of baseline color moment types, for the baseline video stream;

introducing a broadcast video stream having a plurality of broadcast frames into the system;

determining a plurality of broadcast color moments, including a plurality of broadcast color moments, for the broadcast video stream;

comparing the baseline color moments, including a plurality of baseline color moment types, with the broadcast color moments; and determining variations between the baseline color and the broadcast color moments.

24. The method according to claim 23 further comprising transmission of a record signal to a baseline signal recorder and recording the baseline video stream upon receipt of the record signal.

25. The method according to claim 23 further comprising determining a plurality of sets of baseline color moments, storing the sets of baseline color moments, and comparing the broadcast color moments with the sets of baseline color moments to find a match between the broadcast color moments and one of the sets of baseline color moments.

26. The method according to claim 25 wherein comparing the broadcast color moments with the sets of baseline color moments comprises comparing the broadcast color moments with the sets of baseline color moments in real time.

27. The method according to claim 25 further comprising storing the broadcast color moments, and wherein comparing the broadcast color moments with the sets of baseline color moments comprises comparing the broadcast color moments with the sets of baseline color moments after the broadcast video stream has been broadcasted.

28. The method according to claim 23 wherein the broadcast video stream comprises a broadcast, digital video stream, and further comprising decoding the broadcast, digital video stream.

29. The method according to claim 23 further comprising selecting one of a plurality of broadcast video streams to be analyzed and selecting a corresponding baseline video stream form a plurality of baseline video streams for comparison with a selected one of the broadcast video streams.

30. The method according to claim 23 further comprising converting the baseline video stream from analog to digital and converting the broadcast video stream from analog to digital.

31. The method according to claim 23 wherein analyzing the baseline video stream comprises analyzing approximately thirty baseline frames per second in real time and analyzing the broadcast video stream comprises analyzing approximately thirty broadcast frames per second in real time.

32. The method according to claim 23 further comprising:

determining a plurality of baseline central moments for the baseline video stream;

determining a plurality of broadcast central moments for the broadcast video stream;

comparing the baseline central moments with the broadcast central moments;

and determining variations between the broadcast central moments and the baseline central moments.

33. The method according to claim 23 wherein determining variations between the baseline color moments and the broadcast color moments comprises determining Euclidean distances for between corresponding moments for each pair of corresponding frames under comparison.

34. A method for detecting video stream distortion with a video stream distortion detection system, the method comprising:

introducing a baseline video stream having a plurality of baseline frames into the system;

determining a plurality of baseline central moments, including a plurality of baseline central moment types, for the baseline video stream;

introducing a broadcast video stream having a plurality of broadcast frames into the system;

determining a plurality of broadcast central moments, including a plurality of broadcast central moment types, for the broadcast video stream;

comparing the baseline central moments with the broadcast central moments; and determining variations between the baseline central moments and the broadcast central moments.

35. The method according to claim 34 further comprising determining a plurality of baseline color moments for the baseline video stream and determining a plurality of broadcast color moments for the broadcast video stream.

36. A video stream distortion analysis system comprising:

a baseline preparation processor operable to perform an analysis of a baseline video stream having baseline frames, the analysis including determination of a plurality of baseline moments including a plurality of baseline moment types, for the baseline video stream;

a remote comparison processor operable to perk an analysis of a broadcast video stream having broadcast frames, the analysis including determination of a plurality of broadcast moments, including a plurality of broadcast moment types, for the broadcast video stream;

a communications apparatus operable to exchange the baseline moments and the broadcast moments between the baseline processor and the remote processor; and a selected one of the baseline processor and the remote processor being operable to determine variations between the baseline color moments and the broadcast color moments.

37. The system according to claim 36 wherein the communications apparatus comprises a baseline transmitter in operable communication with the baseline processor and being operable to transmit a baseline signal including the baseline moments and a remote receiver in operable communication with the remote processor and being operable to receive the baseline signal, and the remote processor is operable to determine the variations between the baseline color moments and the broadcast color moments.

38. The system according to claim 36 wherein the baseline moments comprise baseline color moments, and the broadcast moments comprise broadcast color moments.

39. The system according to claim 36 wherein the baseline moments comprise baseline central moments, and the broadcast moments comprise broadcast central moments.

40. A video stream distortion analysis system comprising:
a baseline preparation processor operable to perform an analysis of a baseline video stream having a plurality of baseline frames, the analysis including determining a plurality of baseline color moments for the baseline video stream, and to transmit a baseline signal including the plurality of baseline color moments;
a remote comparison processor operable to perform an analysis of a broadcast video stream having a plurality of broadcast frames, the analysis including determining a plurality of broadcast color moments for the broadcast video stream, to receive the baseline signal, and to determine variations between the baseline color moments and the broadcast color moments; and
a baseline digital video recorder operable to record desired segments of the baseline video stream, and a remote digital video recorder operable to record desired segments of the broadcast video stream, and wherein the remote processor is operable to transmit a record signal to the baseline processor, so that the baseline recorder and remote recorder record substantially simultaneously.

41. A video stream distortion analysis system comprising:
a baseline preparation processor operable to perform an analysis of a baseline video stream having a plurality of baseline frames, the analysis including determining a plurality of baseline color moments for the baseline video stream, and to transmit a baseline signal including the plurality of baseline color moments;
a remote comparison processor operable to perform an analysis of a broadcast video stream having a plurality of broadcast frames, the analysis including determining a plurality of broadcast color moments for the broadcast video stream, to receive the baseline signal, and to determine variations between the baseline color moments and the broadcast color moments;
the baseline processor is further operable to determine a plurality of baseline central moments for the baseline video stream, and the remote comparison processor is further operable to determine a plurality of broadcast central moments for the broadcast signal and determine variations between the baseline central moments and the broadcast central moments; and
the baseline processor is operable to determine and the plurality of the baseline central moments includes a plurality of first baseline central moments representing centers of image intensity, a plurality of second baseline central moments representing standard deviation of image intensity, and a plurality of third baseline central moments representing skews of image intensity; and the remote processor is operable to determine and the plurality of the broadcast central moments includes a plurality of first broadcast central moments representing centers of image intensity, a plurality of second broadcast central moments representing standard deviation of image intensity, and a plurality of third broadcast central moments representing skews of image intensity.

42. A video stream distortion analysis system comprising:
a baseline preparation processor operable to perform an analysis of a baseline video stream having a plurality of baseline frames, the analysis including determining a plurality of baseline color moments for the baseline video stream, and to transmit a baseline signal including the plurality of baseline color moments; and
a remote comparison processor operable to perform an analysis of a broadcast video stream having a plurality of broadcast frames, the analysis including determining a plurality of broadcast color moments for the broadcast video stream, to receive the baseline signal, and to determine variations between the baseline color moments and the broadcast color moments;
the baseline processor is further operable to determine a plurality of baseline central moments for the baseline video stream, and the remote comparison processor is further operable to determine a plurality of broadcast central moments for the broadcast signal and determine variations between the baseline central moments and the broadcast central moments; and
the baseline central moments include baseline gray-scale intensity moments, and the broadcast central moments include broadcast gray-scale intensity moments.

43. A video stream distortion analysis system comprising:
a baseline preparation processor operable to perform an analysis of a baseline video stream having a plurality of baseline frames, the analysis including determining a plurality of baseline color moments for the baseline video stream, and to transmit a baseline signal including the plurality of baseline color moments;
a remote comparison processor operable to perform an analysis of a broadcast video stream having a plurality of broadcast frames, the analysis including determining a plurality of broadcast color moments for the broadcast video stream, to receive the baseline signal, and to determine variations between the baseline color moments and the broadcast color moments; and
the baseline processor is operable to determine and the plurality of baseline color moments includes a plurality of first baseline red moments, a plurality of first baseline green moments, and a plurality of first baseline blue moments, the first moments representing averages of color values; the remote comparison processor is operable to determine and the plurality of broadcast color moments includes a plurality of first broadcast red moments, a plurality of first broadcast green moments, and a plurality of first broadcast blue moments.

44. A video stream distortion analysis system comprising:
a baseline preparation processor operable to perform an analysis of a baseline video stream having a plurality of baseline frames, the analysis including determining a plurality of baseline color moments for the baseline video stream, and to transmit a baseline signal including the plurality of baseline color moments;
a remote comparison processor operable to perform an analysis of a broadcast video stream having a plurality of broadcast frames, the analysis including determining a plurality of broadcast color moments for the broadcast video stream, to receive the baseline signal, and to determine variations between the baseline color moments and the broadcast color moments; and
the baseline processor is operable to determine and the plurality of baseline color moments includes a plurality of second baseline red moments, a plurality of second baseline green moments, and a plurality of second baseline blue moments, the second moments representing standard deviations of color values; the remote comparison processor is operable to determine and the plurality of broadcast color moments includes a plurality of second broadcast red moments, a plurality of second broadcast green moments, and a plurality of second broadcast blue moments.

45. A video stream distortion analysis system comprising:
a baseline preparation processor operable to perform an analysis of a baseline video stream having a plurality of baseline frames, the analysis including determining a plurality of baseline color moments for the baseline video stream, and to transmit a baseline signal including the plurality of baseline color moments;

a remote comparison processor operable to perform an analysis of a broadcast video stream having a plurality of broadcast frames, the analysis including determining a plurality of broadcast color moments for the broadcast video stream, to receive the baseline signal, and to determine variations between the baseline color moments and the broadcast color moments; and the baseline processor is operable to determine and the plurality of baseline color moments includes a plurality of third baseline red moments, a plurality of third baseline green moments, and a plurality of third baseline blue moments, the third moments representing skews of color values; the remote comparison processor is operable to determine and the plurality of broadcast color moments includes a plurality of third broadcast red moments, a plurality of third broadcast green moments, and a plurality of third broadcast blue moments.

46. A video stream distortion analysis system comprising:

a baseline video feed device operable to introduce a baseline video stream having baseline frames into the system;

a baseline preparation processor operable to perform an analysis on the baseline video stream frames, the analysis including determining a plurality of baseline moments, including a plurality of baseline moment types for the baseline video stream frames;

a baseline transmitter operable to transmit a baseline signal including the plurality of moments; and a plurality of remote sites, each remote site including:
    a remote video feed device operable to introduce a broadcast video stream having broadcast frames into the system;
    a remote receiver operable to receive the baseline signal from the baseline transmitter;
    a remote comparison processor operable to perform an analysis on the broadcast video stream frames, the analysis including determining a plurality of broadcast moments for the broadcast video stream including a plurality of broadcast moment types, and to determine variations between the baseline moments and the broadcast moments; and the frame variation comprises a sum of absolute differences between the plurality of baseline moments and the plurality of broadcast moments.

47. A method for detecting video stream distortion with a video stream distortion detection system, the method comprising:

introducing a baseline video stream having a plurality of baseline frames into the system;

determining a plurality of baseline color moments for the baseline video stream;

introducing a broadcast video stream having a plurality of broadcast frames into the system;

determining a plurality of broadcast color moments for the broadcast video stream;

comparing the baseline color moments with the broadcast color moments;

determining variations between the baseline color moments and the broadcast color moments; and recording the broadcast video stream upon detection of a variation value above a predetermined variation value.

48. A method for detecting video stream distortion with a video stream distortion detection system, the method comprising:

introducing a baseline video stream having a plurality of baseline frames into the system;

determining a plurality of baseline color moments for the baseline video stream;

introducing a broadcast video stream having a plurality of broadcast frames into the system;

determining a plurality of broadcast color moments for the broadcast video stream;

comparing the baseline color moments with the broadcast color moments;

determining variations between the baseline color moments and the broadcast color moments; and determining the plurality of broadcast color moments comprises determining a second color moment and a third color moment for a selected one of the broadcast frames based on a first moment from an immediately previous broadcast frame to the selected broadcast frame, determining a first moment for the selected frame, and comparing the first moment from the previous broadcast frame with the first moment from the selected broadcast frame.

49. The method according to claim 48 further comprising redetermining the second and third moments for the selected broadcast frame based on the first moment for the selected frame when the first moment for the selected frame is substantially different from the first moment for the previous frame.

50. A method for detecting video stream distortion with a video stream distortion detection system, the method comprising:

introducing a baseline video stream having a plurality of baseline frames into the system;

determining a plurality of baseline color moments for the baseline video stream;

introducing a broadcast video stream having a plurality of broadcast frames into the system;

determining a plurality of broadcast color moments for the broadcast video stream;

comparing the baseline color moments with the broadcast color moments;

determining variations between the baseline color moments and the broadcast color moments; and determining the broadcast color moments comprises determining a first order color moment representing an average value, determining a second order color moment representing a standard deviation value, and a third order color moment representing a skew value.

51. A method for detecting video stream distortion with a video stream distortion detection system, the method comprising:

introducing a baseline video stream having a plurality of baseline frames into the system;

determining a plurality of baseline color moments for the baseline video streams including a plurality of baseline color moment types;

introducing a broadcast video stream having a plurality of broadcast frames into the system;

determining a plurality of broadcast color moments, including a plurality of broadcast color moment types, for the broadcast video stream;

comparing the baseline color moments with the broadcast color moments;

determining variations between the baseline color moments and the broadcast color moments; and transmitting a baseline signal, including the baseline color moments, from a baseline transmitter to a remote receiver.

52. The method according to claim 51 further comprising determining a temporal shift between the baseline signal and the broadcast video stream.

53. The method according to claim 52 wherein determining the temporal shift between the baseline signal and the broadcast signal comprises assuming a temporal shift, determining a cumulative variation for a selected number of frames, repeatedly changing the temporal shift and determining additional cumulative variations for each change in temporal shift, comparing the cumulative variations, and finding an optimal temporal shift providing a minimum cumulative variation.

54. The method according to claim 53 further comprising subsequently evaluating the optimal temporal shift for accuracy by determining further cumulative variations for other temporal shifts, terminating evaluation of the optimal temporal shift when the minimum cumulative variation is achieved, and if necessary resetting the optimal temporal shift.

55. A method for detecting video stream distortion with a video stream distortion detection system, the method comprising:

introducing a baseline video stream having a plurality of baseline frames into the system;

determining a plurality of baseline color moments for the baseline video stream;

introducing a broadcast video stream having a plurality of broadcast frames into the system;

determining a plurality of broadcast color moments for the broadcast video stream;

comparing the baseline color moments with the broadcast color moments;

determining variations between the baseline color moments and the broadcast color moments;

determining a plurality of baseline central moments for the baseline video stream;

determining a plurality of broadcast central moments for the broadcast video stream;

comparing the baseline central moments with the broadcast central moments;

determining variations between the broadcast central moments and the baseline central moments; and determining the baseline central moments comprises determining a plurality of first baseline central moments representing centers of image intensity, determining a plurality of second baseline central moments representing standard deviation of image intensity, and determining a plurality of third baseline central moments representing skews of image intensity; and determining the broadcast central moments comprises determining a plurality of first broadcast central moments representing centers of image intensity, determining a plurality of second broadcast central moments representing standard deviation of image intensity, and determining a plurality of third broadcast central moments representing skews of image intensity.

56. The method according to claim 55 wherein the image intensity comprises gray-scale image intensity.

57. A method for detecting video stream distortion with a video stream distortion detection system, the method comprising:

introducing a baseline video stream having a plurality of baseline frames into the system;

determining a plurality of baseline color moments for the baseline video stream;

introducing a broadcast video stream having a plurality of broadcast frames into the system;

determining a plurality of broadcast color moments for the broadcast video stream;

comparing the baseline color moments with the broadcast color moments;

determining variations between the baseline color moments and the broadcast color moments;

determining the plurality of baseline color moments comprises:

determining a plurality of first baseline red moments, a plurality of first baseline green moments, and a plurality of first baseline blue moments, the first moments representing averages of color values;

determining a plurality of second baseline red moments, a plurality of second baseline green moments, and a plurality of second baseline blue moments, the second moments representing standard deviations of color values; and determining a plurality of third baseline red moments, a plurality of third baseline green moments, and a plurality of third baseline blue moments, the third moments representing skews of color values; and determining the plurality of broadcast color moments comprises:

determining a plurality of first broadcast red moments, a plurality of first broadcast green moments, and a plurality of first broadcast blue moments;

determining a plurality of second broadcast red moments, a plurality of second broadcast green moments, and a plurality of second broadcast blue moments; and determining a plurality of third broadcast red moments, a plurality of third broadcast green moments, and a plurality of third broadcast blue moments.

58. The method according to claim 57 wherein upon detection of a variation greater than a predetermined variation value, determining a type of video distortion causing the variation greater than the predetermined variation value.

59. The method according to claim 58 wherein determining a type of video distortion causing the variation greater than the predetermined variation value comprises:

comparing the first baseline red moments, the first baseline green moments, and the first baseline blue moments with the first broadcast red moments, the first broadcast green moments, and the first broadcast blue moments, respectively;

comparing the second baseline red moments, the second baseline green moments, and the second baseline blue moments with the second broadcast red moments, the second broadcast green moments, and the second broadcast blue moments, respectively; and comparing the third baseline red moments, the third baseline green moments, and the third baseline blue moments with the third broadcast red moments, the third broadcast green moments, and the third broadcast blue moments, respectively.

60. A method for detecting video stream distortion with a video stream distortion detection system, the method comprising:

introducing a baseline video stream having a plurality of baseline frames into the system;

determining a plurality of baseline color moments for the baseline video stream; including a plurality of baseline color moment types;

introducing a broadcast video stream having a plurality of broadcast frames into the system;

determining a plurality of broadcast color moments for the broadcast video stream, including a plurality of broadcast color moment types;

comparing the baseline color moments with the broadcast color moments;

determining variations between the baseline color moments and the broadcast color moments; and determining variations between the baseline color moments and the broadcast color moments comprises determining a sum absolute difference for each pair of corresponding frames under comparison and determining a cumulative difference for a selected number of pairs of corresponding frames.

61. A method for detecting video stream distortion with a video stream distortion detection system, the method comprising:

introducing a baseline video stream having a plurality of baseline frames into the system;

determining a plurality of baseline central moments for the baseline video stream;

introducing a broadcast video stream having a plurality of broadcast frames into the system;

determining a plurality of broadcast central moments for the broadcast video stream;

comparing the baseline central moments with the broadcast central moments;

determining variations between the baseline central moments and the broadcast central moments; and determining the baseline central moments comprises determining six baseline central moments per baseline frame and determining the broadcast central moments comprises determining six broadcast central moments per broadcast frame.

62. The method according to claim 61, wherein determining the six baseline central moments per baseline frame comprises determining the six baseline central moments for all baseline frames and determining the six broadcast central moments comprises determining the six broadcast central moments for all broadcast frames.

63. A method for detecting video stream distortion with a video stream distortion detection system, the method comprising:

introducing a baseline video stream having a plurality of baseline frames into the system;

determining a plurality of baseline central moments for the baseline video stream; introducing a broadcast video stream having a plurality of broadcast frames into the system;

determining a plurality of broadcast central moments for the broadcast video stream;

comparing the baseline central moments with the broadcast central moments;

determining variations between the baseline central moments and the broadcast central moments; and determining a plurality of baseline color moments for the baseline video stream comprises determining nine baseline color moments per baseline frame, and determining the plurality of broadcast color moments for the broadcast video stream comprises determining nine broadcast color moments per broadcast frame.

64. The method according to claim 63 wherein determining the nine baseline color moments per baseline frame comprises determining the nine baseline color moments for all baseline frames, and determining the nine broadcast color moments per broadcast frame comprises determining the nine broadcast color moments for all broadcast frames.

65. A video stream distortion analysis system comprising:

a baseline preparation processor operable to perform an analysis of a baseline video stream having baseline frames, the analysis including determination of a plurality of baseline moments for the baseline video stream;

a remote comparison processor operable to perform an analysis of a broadcast video stream having broadcast frames, the analysis including determination of a plurality of broadcast moments for the broadcast video stream;

a communications apparatus operable to exchange the baseline moments and the broadcast moments between the baseline processor and the remote processor;

a selected one of the baseline processor and the remote processor being operable to determine variations between the baseline color moments and the broadcast color moments; and the baseline moments comprise baseline audio moments, and the broadcast moments comprise broadcast audio moments.

* * * * *

UNITED STATES PATENT AND TRADEMARK OFFICE
CERTIFICATE OF CORRECTION

PATENT NO. : 6,246,803 B1
DATED : June 12, 2001
INVENTOR(S) : John M. Gauch

Page 1 of 1

It is certified that error appears in the above-identified patent and that said Letters Patent is hereby corrected as shown below:

<u>Claim 19,</u>
Line 46, after "moments" insert -- including --.

<u>Claim 29,</u>
Line 53, delete "form" and insert -- from -- therefor.

<u>Claim 36,</u>
Line 40, delete "perk" and insert -- perform -- therefor.

Signed and Sealed this

Nineteenth Day of March, 2002

Attest:

*Attesting Officer*

JAMES E. ROGAN
*Director of the United States Patent and Trademark Office*